United States Patent Office 2,788,664
Patented Apr. 16, 1957

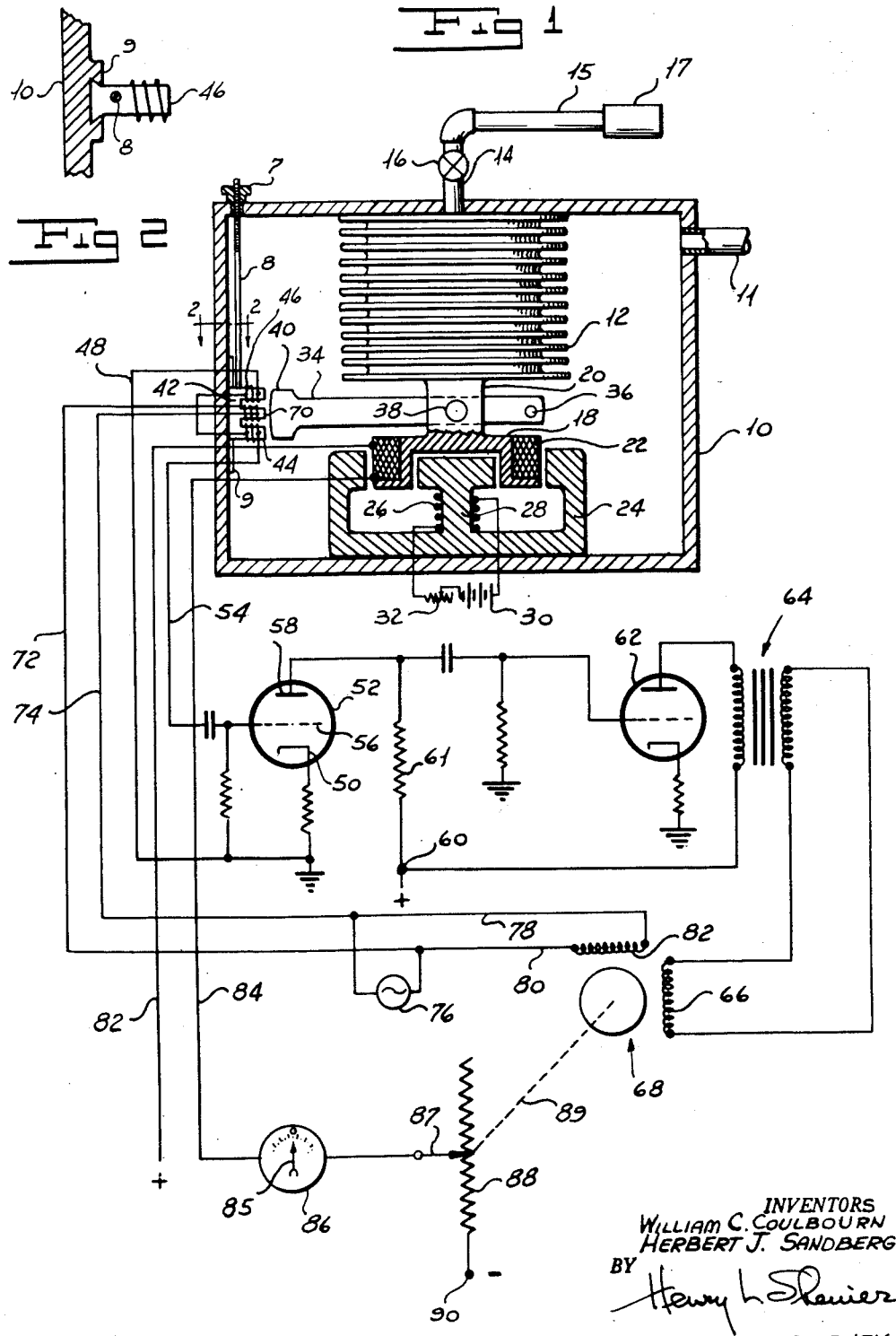

2,788,664

FLUID PRESSURE METER

William C. Coulbourn, Roslyn Heights, and Herbert J. Sandberg, New York, N. Y., assignors, by mesne assignments, to Norden-Ketay Corporation, a corporation of Illinois Application December 19, 1952, Serial No. 326,964

3 Claims. (Cl. 73—398)

Our invention relates to an improved fluid pressure meter and more particularly to a meter for measuring fluid pressure with great precision and accuracy.

Fluid pressure meters in general comprise devices for balancing the pressure of a fluid, either gaseous or liquid, against a predetermined force and then measuring the force at balance. Forces may be supplied by any appropriate manner. A common force-exerting means is a spring. Springs are notoriously nonlinear devices and fluid pressure meters using springs are generally inaccurate. If the spring is a body of compressible fluid, such as a gas, inaccuracies due to temperature changes are introduced. It has been suggested that the pressure exerted by fluid can be balanced against the pull of an electromagnet and the current employed to create the magnetic pull used as a measure of pressure. In these devices the fluid pressure is used to extend or compress a bellows and the extension or compression of the bellows resisted by the pull or thrust of an electromagnet. These devices likewise are inaccurate since the forces in the bellows and the magnetic forces involved are rarely linear for various positions of the armature upon which the electromagnet acts. We have discovered that by positioning the sensing element at a predetermined point and operating about a null we can employ the principle of balancing the pull of an electromagnet against fluid pressure and achieve a fluid pressure meter of remarkable precision and accuracy.

If the pressure to be measured is barometric pressure we can employ our fluid pressure meter as an altimeter. If the pressure to be measured is the difference between Pitot pressure generated by a Pitot tube in a moving aircraft and the static pressure of the circumambient atmosphere our fluid pressure meter can be used as an indicated air speed meter. The precision of our fluid pressure meter is such that it may be employed anywhere for measuring the pressure of fluids with great accuracy.

One object of our invention is to provide an improved fluid pressure meter having high accuracy and precision.

Another object of our invention is to provide an improved fluid pressure meter in which fluid pressure is balanced against the pull of an electromagnet in which the sensing element is brought to a predetermined position in order to produce accurate and uniform results irrespective of the pressure being measured.

Another object of our invention is to provide an improved altimeter.

Another object of our invention is to provide an improved indicated air speed meter.

Other and further objects of our invention will appear from the following description.

In general, our invention contemplates the provision of a bellows confined in a housing which is subjected to the pressure to be measured. Deflection of the bellows is resisted by the pull of an electromagnet. Means are provided for supplying current to the electromagnet to balance the pressure. The arrangement is such that we operate about a null so that the armature and the bellows always remain in a predetermined position. The current required to bring the parts to balance is measured on an ammeter which is calibrated in the desired pressure units.

In the accompanying drawings which form part of the instant specification and which are to be read in conjunction therewith and in which like reference numerals are used to indicate like parts in the various views:

Figure 1 is a diagrammatic view of a fluid pressure meter showing one embodiment of our invention.

Figure 2 is a diagrammatic sectional view drawn on an enlarged scale taken along the line 2—2 of Figure 1.

More particularly referring now to the drawing, a housing 10 may take any appropriate shape or size and may be formed of any suitable material. A bellows 12 is mounted in the housing. In the case of a fluid pressure meter of general application, bellows 12 may be partially evacuated by applying a reduced pressure through pipe 14 and closing valve 16. An armature 18 is carried by the bellows through bracket 20. The armature is provided with a winding 22 disposed between the poles of an annular core 24. The core may be a permanent magnet, if desired. Preferably it may be magnetized to a predetermined degree by a winding 26 disposed about the central pole 28. Current from a battery 30 controlled by a variable resistance 32 is adapted to be passed through the winding 26. An armature 34 is pivoted to the housing about pin 36 and pivotally connected by pin 38 to the bracket 20. The end 40 of the armature is positioned adjacent the core of an E-transformer 42. An increase in pressure within the housing 10 will compress the bellows 12 and lift the end 40 of the armature 34 upwardly. A decrease in pressure within the housing 10 will rotate the armature 34 in a counterclockwise direction and lower the end 40 of the armature. The lower pole 44 and the upper pole 46 of the E-transformer are provided with oppositely wound series-connected windings. The end of the winding upon pole 46 is connected by conductor 48 to the cathode 50 of a thermionic tube 52. The end of the winding upon pole 44 is connected by conductor 54 to the grid 56 of the tube 52. The anode 58 of the tube 52 is connected to a positive potential terminal 60 through a resistor 61. The output of the thermionic tube 52 is impressed upon an amplifier which is represented by a single thermionic tube 62. It is to be understood, of course, that any number of amplifying tubes may be provided to obtain increased sensitivity and hence increased accuracy. The output of the amplifier tube 62 is coupled by a transformer indicated generally by the reference numeral 64 to a winding 66 of a two-phase motor indicated generally by the reference numeral 68. The center pole 70 of the E-transformer 42 is excited through a winding supplied with alternating potential through conductors 72 and 74 from an alternator 76 which may advantageously be a 400-cycle 115-volt machine. The exciting potential for the center winding of the E-transformer is simultaneously impressed by conductors 78 and 80 across the winding 82 of the two-phase motor. The parameters of the channel between conductors 48 and 54 and the winding 66, which includes the amplifying channel, are such that there is a ninety degree phase shift between the potential across conductors 48 and 54 and that across the winding 66.

The winding 22 is energized from any direct current source through conductor 82. Current will flow through the winding 22, returning through conductor 84, ammeter 86, brush 87 and a portion of resistor 88 to the opposite side 90 of the direct current source. The brush 87 is controlled by the two-phase motor 68 through any appropriate mechanical connection, shown diagrammatically by the dotted line 89. The lowering of the brush 87 reduced the portion of the resistance 88 encompassed in the exciting circuit for the winding 22 and thus increases the magnetic pull exercised by the interaction between the winding 22 and the magnet 24. Conversely, raising the brush increases the resistance included in this circuit and hence reduces the current flowing through the winding 22 and the magnetic flux generated.

It will be observed that neither the voltage supply for the current flowing through winding 22 nor the linearity of the resistor 88 is important for accuracy, since the current will always be adjusted to a predetermined value by the motor 68. It is the current flowing through the winding 22 which is measured, and the pressure is always proportional to the current.

The E-transformer is slidably mounted in a slot formed on the box 9 which is part of the housing 10. A shaft 8 is rotatably positioned in the E-transformer and extends upwardly through the wall of the casing 10 through an appropriate sealing portion. The end of shaft 8 is threaded and carries a nut 7 which bears upon the top of the housing 10. By rotating the nut 7, the position of the E-transformer can be adjusted upwardly or downwardly.

In operation a fluid under a known pressure is led through pipe 11 into the interior of the housing 10. This pressure compresses the bellows 12, it being understood that the valve 16 is closed after the interior of the bellows has been evacuated to the predetermined pressure to which the meter 86 has been calibrated. The scale on the ammeter 86 should now read to the predetermined known pressure. If it does not, the nut 7 is adjusted up or down until this pressure is read. Another known pressure is then applied to pipe 11 and the pressure read upon the ammeter 86. If the ammeter does not read correctly, the slope of the curve of force of the electromagnet 24 has shifted. This may be due to a variation of the voltage of the battery 30 or a variation in the resistance of resistor 32. A change in the current flowing through the winding 26 is analagous to shifting the fulcrum of a lever. This will change the scale factor to which the ammeter 86 has been calibrated. Accordingly, if the second reading is not correct, the resistance of resistor 32 is varied and the position of the E-transformer is again changed so that correct readings will be obtained at two points on the curve. Since this curve is substantially a straight line, two points on the curve will determine the correct slope. Our meter can be calibrated additionally by varying the pressure which exists within the bellows. This is more time-consuming than the method we have just described. After the meter is calibrated, the pressure which is to be measured is led through the pipe 11 into the interior of the housing 10. Let us assume that the calibration of the meter is such that the zero reading indicates atmospheric pressure. If the pressure is above atmospheric, the bellows 12 will be compressed and will move upwardly, pulling the armature 18 upwardly and pivoting the armature 34 in a clockwise direction. The end 40 of the armature 34 will thus be moved upwardly and the magnetic path between pole 44 and pole 70 will be lengthened while the magnetic path between pole 70 and pole 46 will be reduced. With the end 40, which is a sensing element, in the neutral or null position, equal and opposite potentials will be generated in the windings upon poles 44 and 46. When the armature 34 is moved upwardly, however, a greater potential will be generated in the winding upon pole 46 with respect to the potential in the winding upon pole 44. The voltages in the windings upon poles 44 and 46 are one hundred and eighty degrees out of phase. This voltage difference is impressed across the grid to cathode circuit of the tube 52 and energizes the amplifying channel such that a voltage, say leading the voltage in winding 82 of the two-phase motor 68, will be impressed across the winding 66. This will cause the motor to turn in a direction to lower the brush 87 upon the resistor 88 thus increasing the current flowing through the winding 22. This will cause the winding 22 to move downwardly between the poles of the electromagnet 24. This motion rotates the armature 34 in a counterclockwise direction and brings it back to its null position. As it approaches the null position, the voltage across the winding 66, and hence the current flowing through the winding, will be reduced gradually, slowing the speed of the rotor of the two-phase motor 68. The increase in current through the winding 22 is measured by the ammeter 86 which is calibrated in the desired units of pressure.

Let us assume that a reduced pressure is applied through pipe 11, that is, a pressure below atmospheric. In this case, the bellows 12 will expand, moving the armature 18 downwardly and rotating the armature 34 in a counterclockwise direction. When this occurs, a greater voltage will be induced in the winding upon pole 44 than in the winding upon pole 46. This voltage, it will be remembered, is one hundred and eighty degrees out of phase with the voltage in the winding upon pole 46. A voltage will then be induced through the amplifying channel across winding 66 such that it will lag the voltage in winding 82 by ninety degrees. This causes the rotor of the two-phase motor 68 to rotate in the opposite direction, raising the brush 87 and increasing the resistance included in the circuit through winding 22, thus reducing the current flowing through the winding. Reduction in current will reduce the pull of armature 18 and permit the armature 34 to return to its null position. The reduced current is read upon the ammeter 86 as a pressure below atmospheric, the pointer 85 of the ammeter moving to the other side of the calibrated reference zero.

In this manner our fluid pressure meter measures the pressure of any fluid with respect to any predetermined reference pressure in an accurate manner operating about a zero or null point or position of parts, thus eliminating nonlinearity. The accuracy of the system is independent of the voltage applied across resistor 88 or of the linearity of this resistor. The current will always be adjusted to a point of balance so that the current will measure the pressure with high accuracy. It will be observed, furthermore, that small changes in potential caused by pressure differences are amplified. By increasing the amplification of the amplifying channel and choosing circuit parameters properly, comparatively small changes in pressure can be measured with a high degree of precision.

Our fluid pressure meter can be employed as an altimeter by calibrating it in feet of altitude as a function of units of atmospheric pressure of the altitude being measured. The bellows 12 is evacuated to any appropriate reduced pressure. The meter 86 is calibrated to a logarithmic scale to indicate altitude in any appropriate units. In flight, as the pressure is reduced, the current flowing through the winding 22 and hence the ammeter 86 will be correspondingly reduced.

Our fluid pressure meter can be used conveniently to measure differential pressures in which one pressure is communicated to the interior of the bellows through pipe 15 by opening valve 16 and the other pressure communicated to the interior of the housing 10 through pipe 11. A specialized case of the measure of differential pressure is that of indicated air speed. This is a function of $$(P_v - P_s)A$$

where $P_v$ is Pitot pressure, $P_s$ is static pressure and $A$ is the area of the bellows, which is constant. Accordingly, the interior of the bellows may be subjected to Pitot dynamic pressure through pipe 15 which communicates with a Pitot tube 17, it being understood that valve 16 may be omitted or be opened. Pipe 11 communicates with static pressure. The ammeter 86, of course, will be calibrated in units of indicated air speed.

It will be seen that we have accomplished the objects of our invention. We have provided a fluid pressure meter adapted to measure pressure with great precision and accuracy. Our fluid pressure meter operates about a null with all of the parts in predetermined position. In this manner we eliminate inaccuracies introduced by nonlinearity in the bellows, non-uniformity in the magnetic cores, unequal distribution in the magnetic flux and hysteresis which may exist in the bellows or the magnetic core. Our fluid pressure meter can be conveniently and expeditiously zeroed and calibrated so that variations in any of the components, as, for example, aging of the conductors, aging of the bellows, the development of residual magnetism in any of the cores, or the like, are automatically compensated for. Our fluid pressure meter can be simply and expeditiously used not only to measure pressure with reference to any desired standard but differential pressures as well. It can be used as an altimeter and as an indicated air speed meter.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. In a fluid pressure meter, a housing, means providing communication between the interior of the housing and the fluid whose pressure is to be measured, a bellows mounted in the housing, an electromagnet having a magnetic field mounted in the housing, means for adjusting the magnetic field of said electromagnet, a winding carried by the bellows and positioned in said magnetic field, an armature pivotally carried by said housing, means connecting the armature to the winding for movement therewith, a sensing means having a null point mounted within the housing adjacent the armature, a means responsive to the displacement of the armature with respect to the sensing means for producing a signal agreeable to the direction of displacement of the armature from the null point, a circuit including a source of potential and a variable impedance for energizing said winding, means responsive to said signal for varying said impedance to alter the current flowing through said winding to change the magnetic pull thereof to restore the armature to its null position and means for measuring the current flowing through the winding as the desired measurement of pressure.

2. In a fluid pressure meter a housing, means for introducing fluid under a first pressure to the interior of said housing, a bellows mounted in the housing, means for introducing fluid under a second pressure into the interior of said bellows, a magnet having a magnetic field mounted in the housing, a winding carried by the bellows and positioned in said magnetic field, an armature within the housing pivotally carried thereby, means connecting the armature to the winding for movement therewith, a sensing means having a null point mounted within the housing adjacent the armature, a means responsive to displacement of the armature with respect to the sensing means for producing a signal agreeable to the direction of displacement of the armature from the null point, a circuit including a source of potential and a variable impedance for energizing said winding, means responsive to said signal for varying said impedance to alter the current flowing through said winding to change the magnetic pull thereof to restore the armature to its null position and means for measuring the current flowing through the winding as a measurement of the difference between said first and second pressures.

3. In a fluid pressure meter, a housing, means providing communication between the interior of the housing and the fluid whose pressure is to be measured, a bellows mounted in the housing, a magnet having a magnetic field mounted in the housing, a winding carried by the bellows and positioned in said magnetic field, an E-transformer having a center winding and a pair of oppositely wound outer windings, means for exciting said center winding, an armature pivotally carried by said housing, said armature being disposed adjacent said E-transformer windings and movable to vary the respective magnetic flux paths between the center winding and the outer windings, means for connecting said outer windings in series to produce a difference signal agreeable to the direction of displacement of said armature with respect to said center winding, means connecting said armature to said winding for movement therewith, a circuit including a source of potential and a variable impedance for energizing said bellows carried winding, means responsive to said difference signal for varying said impedance to alter the current flowing through said bellows carried winding to change the magnetic pull thereof to restore the armature to its null position, means for measuring the current flowing through the winding as the desired measurement of pressure and adjustable means for mounting said E-transformer on said housing.

References Cited in the file of this patent

UNITED STATES PATENTS

| | | |
|---|---|---|
| 1,191,416 | Gibson | July 18, 1916 |
| 2,320,881 | Newton | June 1, 1943 |
| 2,371,040 | Fisher et al. | Mar. 6, 1945 |
| 2,422,687 | Lilienthal | June 24, 1947 |
| 2,447,212 | Schoeppel | Aug. 17, 1948 |
| 2,568,586 | Hunt et al. | Sept. 18, 1951 |
| 2,598,681 | Garbarini et al. | June 3, 1952 |
| 2,620,665 | Carlisle et al. | Dec. 9, 1952 |

FOREIGN PATENTS

| | | |
|---|---|---|
| 133,056 | Great Britain | Dec. 16, 1920 |